April 25, 1939.   F HARLOW   2,155,544
TRAP
Filed Jan. 31, 1938

Inventor
Fred Harlow
By W. A. McCluskey
Attorney

Patented Apr. 25, 1939

2,155,544

UNITED STATES PATENT OFFICE 2,155,544

TRAP

Fred Harlow, Newark, Ohio

Application January 31, 1938, Serial No. 187,861

7 Claims. (Cl. 43—61)

This invention relates to improvements in traps, and has particular reference to traps adapted for catching rodents, wild field or woods animals or birds in a live state and without injury thereto, the principal object of the invention residing in the provision of a trap having a casing formed to provide open ends with slidable doors arranged to close said ends by the operation of a trip or release mechanism actuated by the weight of the trapped living thing passing through the casing.

A further object of the invention resides in the provision of a trap of simple and inexpensive construction and wherein door releasing mechanism is provided capable of positively functioning under various climatic conditions, one capable of being readily set to maintain the sliding doors of the casing in an open position and sensitive and rapid in operation.

With these and other objects in view, the invention consists in the novel features of construction, combinations and arrangements of parts hereinafter fully described and particularly pointed out in the appended claims.

Figure 1:
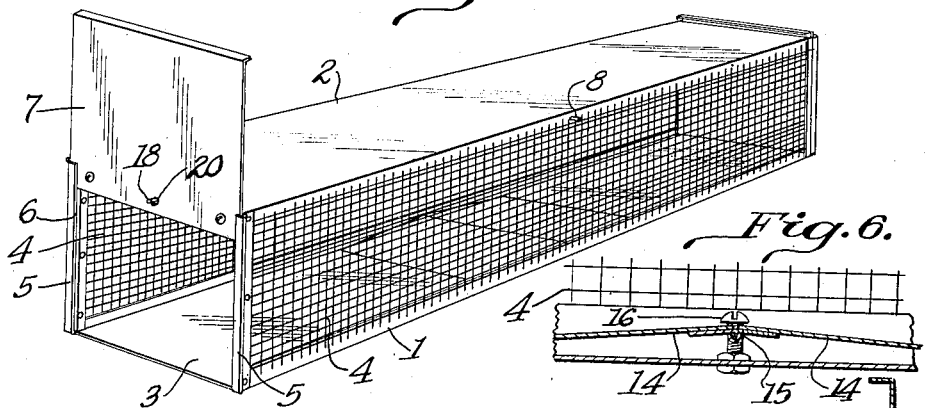
Fig. 1 is a perspective view of a trap constructed in accordance with the present invention.
Figure 6:
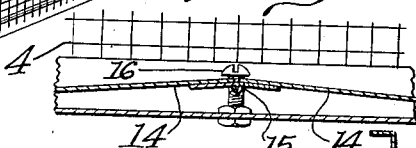
Fig. 6 is a detail vertical sectional view on the plane indicated by the line VI—VI of Fig. 3.

Referring more particularly to the drawing, the numeral 1 designates the casing or frame of my improved trap, the same in this instance comprising sheet metal top and bottom walls 2 and 3, respectively, and a pair of vertical foraminous side walls 4—4, these walls being united to produce a rigid and substantial frame or casing having normally open ends.

Connected with the opposite vertical edges of the side walls 4—4 are door guiding strips 5 which are provided with grooves or channels 6 for the sliding reception of a pair of door forming plates 7—7 by which the casing or frame is closed when an animal or other live thing is trapped within the casing.

Figure 2:
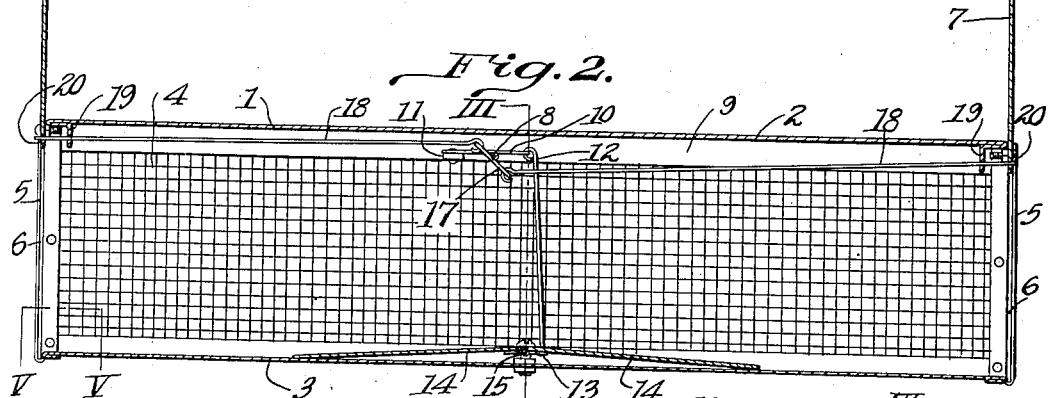
Fig. 2 is a vertical longitudinal sectional view taken through the trap, the end doors being disclosed in their latched open positions.
Figure 5:
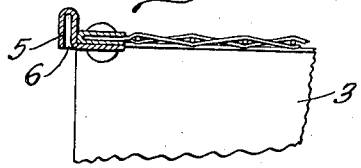
Fig. 5 is a detail horizontal sectional view on the line V—V of Fig. 2.
Figure 3:
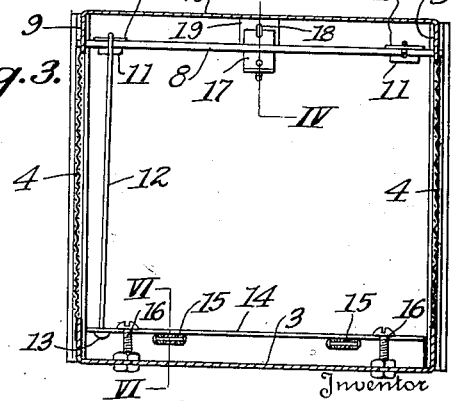
Fig. 3 is a vertical transverse sectional view on the plane indicated by the line III—III of Fig. 2.
Figure 4:
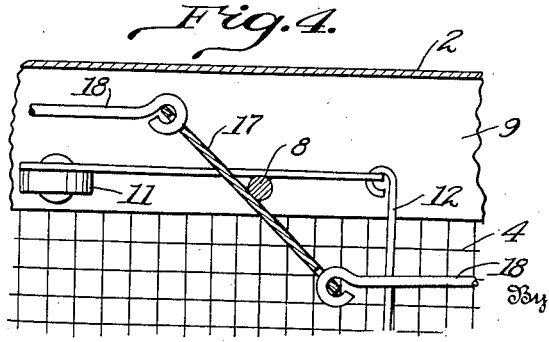
Fig. 4 is a detail vertical sectional view on the line IV—IV of Fig. 3.

The operation of the doors and their automatic closing is effected by the provision of a rock shaft 8, which is journaled transversely in the upper portion of the trap casing contiguous to the center of the trap, as shown in Fig. 2. The ends of the shaft 8 are journaled in the depending side flanges 9—9 of the trap wall 2. The rock shaft is provided adjacent to each end thereof, and within the confines of the casing, with a pair of fixed arms 10—10. One end of each of these arms carries a counterweight 11, while the opposite end of each of said arms is connected with the upper end of a vertically extending wire link 12. The lower ends of the links 12 are connected as at 13 with one of a pair of movable floor plates 14, which are normally disposed with their ends in engagement with the bottom wall 3 and at a slight angle with respect thereto, the said plates being reversely inclined, as disclosed in Fig. 2.

The adjoining or meeting edges of said plates are hingedly connected as at 15 and vertical studs 16 having headed upper ends are so disposed that their shank portions are receivable within openings provided in the adjoining edge portions of the plates 14. The studs 16 guide the floor plates and also limit the upward movement of the plates in response to the forces exerted thereon by the counterweighted arms 10, the weights 11 possessing sufficient mass to effect the elevation of the plates 14 into contact with the headed upper ends of the studs 16, as disclosed in Fig. 2.

Also attached to the shaft 8 to rock therewith is a centrally disposed arm 17, and the ends of this arm are pivotally connected with a pair of oppositely extending latch rods 18. These rods are located immediately beneath the top wall 2 of the casing and extend longitudinally of the center of the latter. The outer ends of the rods 18 are slidably received within openings formed in connection with flanges 19, depending from the opposite ends of the top wall 2, and the ends of the rods 18 project a sufficient distance beyond the flanges 19 so that they will be permitted to enter and extend slightly beyond openings 20 provided centrally in the lower portions of the door plates 7—7.

In the operation of the trap, the door plates are elevated manually and when fully elevated, the outer ends of the rods 18 will project through the openings 20 in order to maintain the door plates in their elevated positions. The construction of the casing or frame of the trap provides an unobstructed runway therethrough which is naturally inviting to birds or animals or the trap may be baited by the placing of selected foods in the center thereof. When an animal or bird engages the floor plates 14, the weight of the wild thing will cause the plates to move downwardly against the resistance of the counterweight or counterweights 11 so that the shaft 8 will be rocked in a direction effecting the retraction of the latch rods 18 so that the outer ends of said latch rods will be withdrawn to a position clear of the door plates 7—7. The door plates then drop sharply by the action of gravity, closing the opposite ends of the trap and trapping the bird or animal therein without physical injury.

The trap comprising the present invention is particularly adapted for use by the game conservation departments of various States in that it enables wild game such as quail, partridges, rabbits and the like to be trapped in locations where they are apparently abundant and transported without injury to other locations where a scarcity of such wilde life exists. The trap is free from mechanical complication which is apt to cause difficult and improper operation during periods of cold weather, by reason of freezing or the like and its construction is such as to offer no obstacle or obstruction to the passage of animals or birds therethrough, there being nothing about the internal or external appearance of the trap which tends to frighten wild life away from the same. If desired, the exterior of the trap may be covered, when placed in a field, with leaves, twigs or branches so that the casing may be externally masked or concealed when in use.

By the provision of the vertically slidable door, when the trap is set for operation, the doors will project above the main body of the trap and will serve as an indication as to whether or not the trap has been operated. In the ordinary size trap, the doors are of such size that they may be seen from a considerable distance. When the doors are fully open, they will offer absolutely no interference to the entrance of an animal into the trap, substantially the full cross sectional area of the trap body being open to the passage of the wild thing thereinto.

What is claimed is:

1. A trap for animals or fowls comprising a box-like casing open at the ends thereof, door plates having openings therein for closing said open ends, vertical guides carried by the ends of said casing for the slidable reception of said door plates, a rock shaft journaled transversely in the casing intermediately of the ends thereof, a crank element fixed to oscillate with said shaft within the interior of said casing contiguous to its top, latch rods having their inner ends connected with opposite portions of said crank element, the outer ends of said rods being slidably supported in connection with the outer portions of said casing and receivable within the openings formed in said door plates whereby to maintain said plates in elevated positions opening the ends of said trap, a movable floor plate arranged in the bottom of said trap intermediate of the ends thereof, a link uniting said floor plate with said rock shaft, and means normally acting on said rock shaft to maintain said floor plate in an elevated position and said latch rods in their extended door latching positions.

2. In a trap, a box-like casing comprising horizontal top and bottom walls, vertical side walls and open ends, the said casing forming an open-ended runway for the passage of birds or animals therethrough, normally elevated sliding closures carried by the ends of said casing, a rock shaft journaled transversely in said casing intermediately of the ends thereof, a crank element movable with said rock shaft, a pair of longitudinally extending latch rods, said rods having their inner ends connected with said crank element on opposite sides of said rock shaft, the outer ends of said rods being retractably engaged with said closures so that said rods when in their extended positions effect the support of said closures, a pair of hingedly connected floor plates arranged on the bottom wall of said casing between the ends of the latter, and means actuated by the movement of said floor plates in response to the weight of an animal or bird passing through said runway for rocking said shaft to effect movement of said latch rods to their retracted positions and the automatic closing of the ends of said trap by said sliding closures.

3. In a trap, a box-like casing comprising top and bottom walls, foraminated vertical side walls and open ends, the said casing forming a runway for the travel of birds or animals therethrough, sliding closure plates carried by the ends of said casing, a rock shaft journaled transversely in said casing in approximately the center thereof and arranged immediately below the top wall of said casing, crank elements fixed to oscillate with said rock shaft, latch rods extending longitudinally of said casing immediately below its top wall, the inner ends of said rods being pivotally connected with said crank elements and the outer ends thereof being slidably engaged with the lower portions of said closure plates so that said rods when in their extended positions will serve to effect the support of said plates, a pair of reversely inclined floor plates arranged on the bottom of said trap, link means uniting said floor plates with said rock shaft and operable when said floor plates receive the weight of an animal or bird passing through the runway to effect the oscillation of said rock shaft and the retraction of said latch rods to effect downward sliding movement of said closure plates, and counterweight means connected with said rock shaft and normally serving to maintain said floor plates in their elevated positions and the latch rods in their extended positions.

4. In an animal trap of the type having a box-like casing with open ends and slidably mounted doors for closing said open ends, means for controlling the action of said doors comprising a pair of reversely inclined movable floor plates arranged on the bottom of said casing, a transversely extending shaft journaled in the upper portion of said casing, link means for connecting the raised ends of said floor plates with said shaft to impart rotary movement to said shaft upon vertical movement of said floor plates, counterweight means connected with said shaft to yieldably hold said plates in inclined positions, crank means carried by said shaft, and latch rod means connected with said crank means and engaging said doors to hold them in open position.

5. In an animal trap of the type having a box-like casing with open ends and slidably mounted doors for closing said open ends, means for controlling the action of said doors comprising a pair of reversely inclined movable floor plates arranged on the bottom of said casing, hinge means connecting the elevated ends of said floor plates, a transversely extending shaft journaled in the upper portion of said casing, link means disposed adjacent the sides of said casing for connecting the elevated ends of said floor plates with said shaft to impart rotary movement thereto upon vertical movement of said plates, means connected with said shaft to yieldably maintain said plates in inclined positions, crank means carried by said shaft, and latch rod means connected with said crank means and engaging said doors to hold them in open position.

6. In an animal trap of the type having a boxlike casing with open ends and slidably mounted doors for closing said open ends, means for controlling the action of said doors comprising a pair of reversely inclined movable floor plates arranged on the bottom of said casing, hinge means connecting the elevated ends of said floor plates, guide means for confining said floor plates to vertical movement only, a transversely extending shaft journaled in the upper portion of said casing, link means disposed adjacent the sides of said casing for connecting the elevated ends of said floor plates with said shaft to impart rotary movement thereto upon vertical movement of said plates, means connected with said shaft to yieldably maintain said plates in inclined positions, crank means carried by said shaft, and latch rod means connected with said crank means and engaging said doors to hold them in open position.

7. In an animal trap of the type having a boxlike casing with open ends and slidably mounted doors for closing said open ends, means for controlling the action of said doors comprising a pair of reversely inclined movable floor plates arranged on the bottoms of said casing, hinge means connecting the elevated ends of said floor plates, means for limiting the movement of said floor plates, a transversely extending shaft journaled in the upper portion of said casing, link means disposed adjacent the sides of said casing for connecting the elevated ends of said floor plates with said shaft to impart rotary movement thereto upon vertical movement of said plates, means connected with said shaft to yieldably maintain said plates in inclined positions, crank means carried by said shaft, and latch rod means connected with said crank means and engaging said doors to hold them in open position.

FRED HARLOW.